United States Patent [19]

Petersen

[11] Patent Number: 5,079,739
[45] Date of Patent: Jan. 7, 1992

[54] APPARATUS AND METHOD FOR CONVERTING BIT-MAPPED DATA FROM ROW ORIENTATION TO COLUMN OR ORIENTATION

[75] Inventor: Mark A. Petersen, Maple Grove, Minn.

[73] Assignee: DataCard Corporation, Minnetonka, Minn.

[21] Appl. No.: 574,509

[22] Filed: Aug. 28, 1990

Related U.S. Application Data

[63] Continuation of Ser. No. 248,899, Sep. 23, 1988, abandoned.

[51] Int. Cl.[5] ...................... G06F 12/02; G06F 13/14
[52] U.S. Cl. .................. 395/800; 364/235.7; 364/255.1; 364/256.8; 364/920.7; 364/926.7; 364/927.67; 364/965.76; 364/966.4; 364/958.2; 364/DIG. 1; 364/DIG. 2; 395/100
[58] Field of Search ............. 364/200, 900, 518, 519, 364/521; 382/46; 340/727, 735; 400/110

[56] References Cited

U.S. PATENT DOCUMENTS

| | | | |
|---|---|---|---|
| 4,052,699 | 10/1977 | Micka et al. | 364/900 |
| 4,168,488 | 9/1979 | Evans | 364/521 X |
| 4,271,476 | 6/1981 | Lotspiech | 364/515 |
| 4,545,069 | 10/1985 | Kermisch | 382/46 |
| 4,560,980 | 12/1985 | Tillich | 340/727 |
| 4,740,784 | 4/1988 | Fick | 340/728 X |
| 4,745,576 | 5/1988 | Hasegawa et al. | 364/900 |
| 4,776,026 | 10/1988 | Ueyama | 382/46 |
| 4,806,920 | 2/1989 | Sawada | 340/727 |
| 4,808,985 | 2/1989 | Tanuma et al. | 340/727 |
| 4,837,845 | 6/1989 | Pruett et al. | 340/727 X |
| 4,929,085 | 5/1990 | Kajihara | 364/518 |
| 4,947,344 | 8/1990 | Hayashi et al. | 364/518 |

FOREIGN PATENT DOCUMENTS

| | | | |
|---|---|---|---|
| 56-11264 | 2/1981 | Japan . | |
| 58-62776 | 4/1983 | Japan | 340/735 |
| 60-54872 | 3/1985 | Japan . | |

Primary Examiner—Thomas C. Lee
Assistant Examiner—Daniel Pan
Attorney, Agent, or Firm—Merchant, Gould, Smith, Edell, Welter & Schmidt

[57] ABSTRACT

An apparatus and method is described for converting row-oriented data into column-oriented data. A matrix of row-oriented data is read from a ROM device and stored in a plurality of latches. All the bits from one column of said data is selected from the latches and stored in a register.

2 Claims, 4 Drawing Sheets

APPARATUS AND METHOD FOR CONVERTING BIT-MAPPED DATA FROM ROW ORIENTATION TO COLUMN OR ORIENTATION

This is a continuation of Ser. No. 248,899, filed Sept. 23, 1988, now abandoned.

TECHNICAL FIELD OF THE INVENTION

The present invention pertains generally to a device and method that transforms row-oriented data read from a Read Only Memory (ROM) device into column-oriented data.

BACKGROUND OF THE INVENTION

Some types of graphics printers use a thermal printhead to transfer image data stored in a computer memory onto a printing surface. The thermal printhead may provide a single "column" of dots vertically oriented with respect to the printing surface. Thus, image data is printed one or more columns at a time. A thermal printhead is made up of "dots" or resistive elements that heat up a foil and transfer ink from a carrier (ribbon). The areas to be printed have the dots heated up; the areas left blank have the dots remain cool. Each dot can be represented by a binary digit, wherein a binary "1" means the corresponding dot is turned on and a binary "0" means the corresponding dot is turned off. This binary data is easily stored in a computer memory, but the image data must be column-oriented for it to print correctly on the vertically oriented printhead described above.

Performance problems arise when printing Japanese Kanji characters. Kanji character sets stored in ROM are accessed by rows. Such a ROM device is the Hitachi 4 megabit HN62404, wherein a bit mapped Kanji character set resides in 2 ROM chips. There are two different character sets available from Hitachi, comprised of two different font sizes. One character set is made up of 24 bit × 24 bit characters and the other set is made up of 32 bit × 32 bit characters. In both cases, each character is located in a 32 bit × 32 bit memory space divided between the two ROM chips. Each character row in the device is accessed using an 18 bit address. The most significant 13 bits of the address identify the Kanji character; the least significant 5 bits of the address identify the rows making up the Kanji character.

Each Kanji character resides in this device in a manner described by FIG. 2. Half of each Kanji character is located in each of two ROMs: the "left" half in ROM 18 and the "right" half in ROM 19. Both 18 and 19 are is divided into two halves, 20/21 and 22/23 respectively. Although each row of 18 and 19 is comprised of 16 bits, data is read from the device one byte at a time.

A software program could be used to read directly the row-oriented Kanji character data in the ROMs, but for printing the image data must be column-oriented. Therein lies the problem. If the software simply reads directly the row-oriented data in the ROM, then to create one byte of column-oriented data the ROM must be read eight times and consecutively mask off seven bits. The problem, then, is speed of conversion. It has been estimated that it may take software from 2 to 5 milliseconds to convert a 32 bit × 32 bit Kanji character. If the image has 200 characters in it, then:

$$200 \frac{\text{Characters}}{\text{Image}} \times 0.002 \frac{\text{Seconds}}{\text{Character}} = 0.4 \frac{\text{Seconds}}{\text{Image}}$$

If it takes 0.4 seconds per image to convert 200 Kanji characters from row orientation to column orientation, then the printer is drastically slowed down. What is needed is a fast method of converting the row-oriented Kanji character into a column-oriented image.

SUMMARY OF THE INVENTION

The present invention provides an apparatus and method for converting row-oriented ROM data into column-oriented data.

BRIEF DESCRIPTION OF THE DRAWINGS

In the drawings, where like numerals refer to like elements throughout the several views.

DETAILED DESCRIPTION OF THE PREFERRED EMBODIMENT

In the following detailed description of the preferred embodiment, reference is made to the accompanying drawings which form a part hereof, and which is shown by way of illustration a specific embodiment in which the invention may be practiced. It is to be understood that other embodiments may be utilized without departing from the scope of the present invention.

Figure 3:
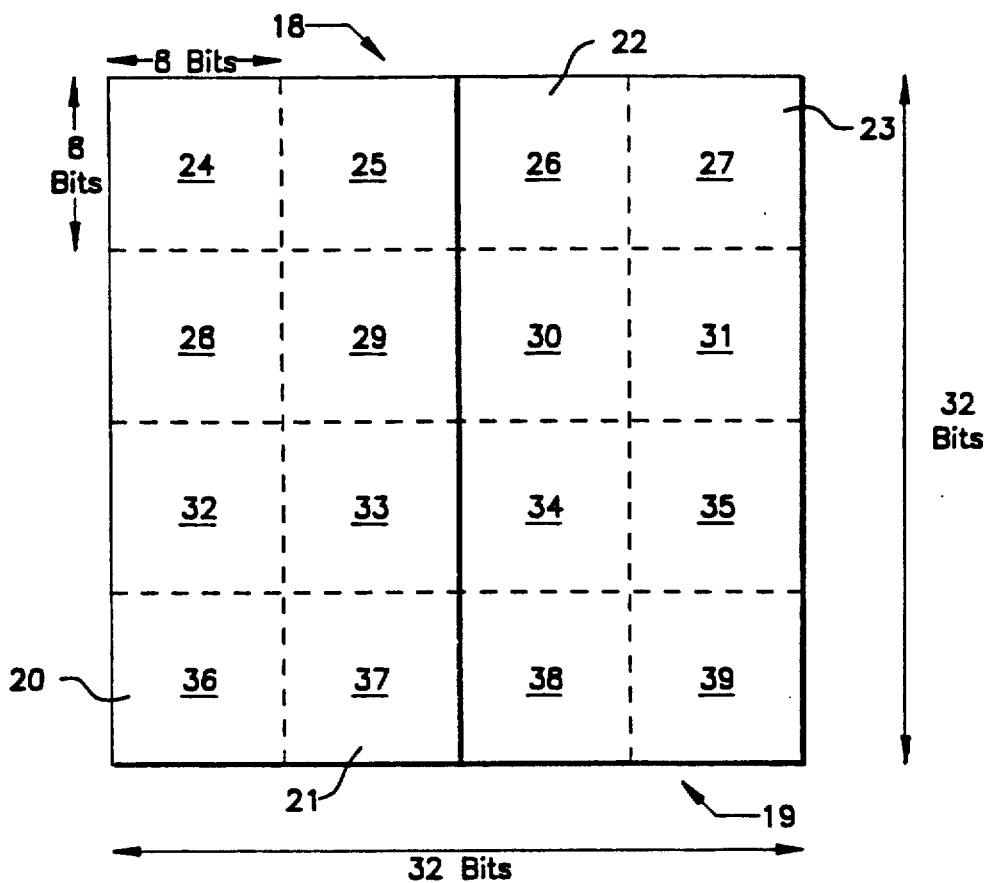
FIG. 3 is an illustration of how a 32 bit × 32 bit Kanji character is viewed as 16 separate 8 bit × 8 bit matrices.
Figure 4:
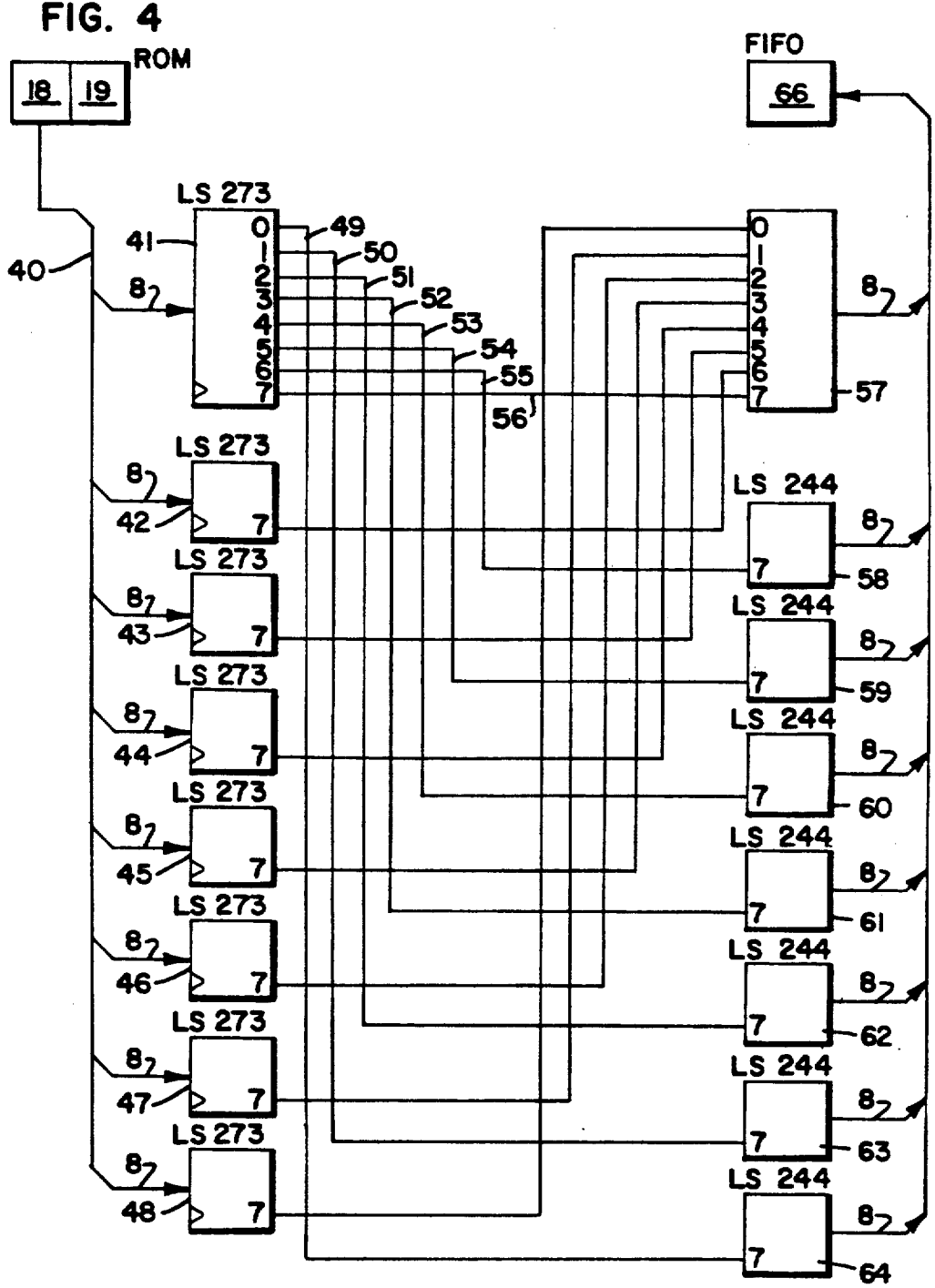
FIG. 4 is a block diagram of the hardware used to convert row-oriented data into column-oriented data.
Figure 5:
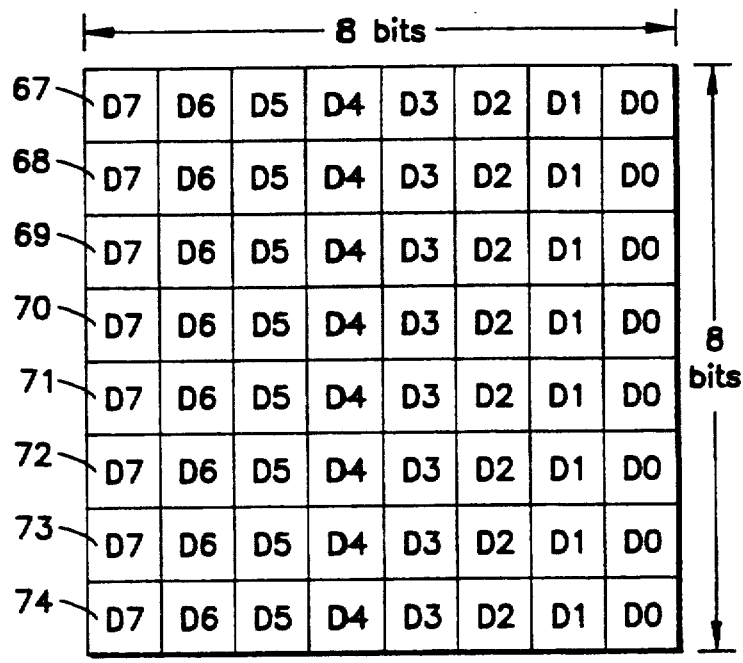
FIG. 5 is an illustration of the row-orientation of an 8 bit × 8 bit matrix prior to conversion.
Figure 6:
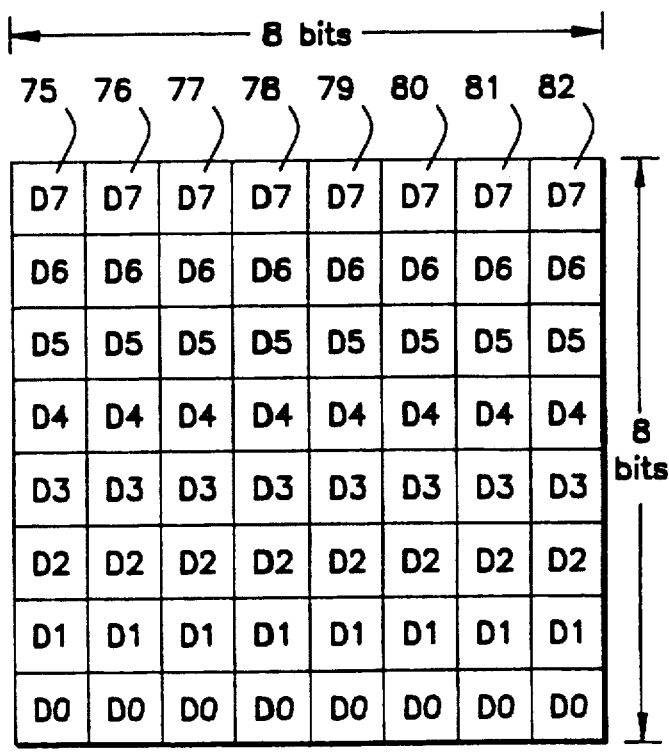
FIG. 6 is an illustration of the column-orientation of an 8 bit × 8 bit matrix after conversion.

The preferred embodiment converts, in hardware, a 32 bit × 32 bit row-oriented Kanji character into a column-oriented Kanji character. The Kanji character is treated as 16 separate 8 bit × 8 bit matrices as shown in FIG. 3. The row orientation of the data in the 8 bit × 8 bit matrix is shown in FIG. 5, wherein each bit is labeled as 67 through 74. Each data bit D7 is on the "left" side of the matrix and each data bit D0 is on the "right" side of the matrix. Conversion of an 8 bit × 8 bit matrix is performed by reading all 8 rows of data in a particular matrix from the ROM and writing the data into 8 separate 8 bit latches. The LS273 latches are shown in FIG. 4, labeled as 41 through 48. Once the data for the 8 bit × 8 bit matrix is held outside the ROM, it can be manipulated as required without reading of the ROM again. As shown in FIG. 4, conversion from row orientation to column orientation is done by selecting each LS244 line driver, labeled in FIG. 4 as 57 through 64, in turn, and writing the selected data into a First-In-First-Out (FIFO) register 66 that is deep enough to hold the entire 32 bit × 32 bit Kanji character (i.e., 128 separate 8 bit registers). The column orientation of the data in the 8 bit × 8 bit matrix after conversion is shown in FIG. 6, wherein each byte is labeled as 75 through 82. Thus, the row-oriented data is converted into column-oriented data.

Note that all of the lines or interconnects between the LS273 latches, 41 through 48, and the LS244 ports, 57 through 64, are not shown in FIG. 4. Only 8 interconnects are shown, labeled as 49 through 56 in FIG. 4, to maintain clarity in the drawing, because 64 interconnects exist between the latches and ports. The interconnects required for converting bits in column 75 are fully shown.

Figure 1:
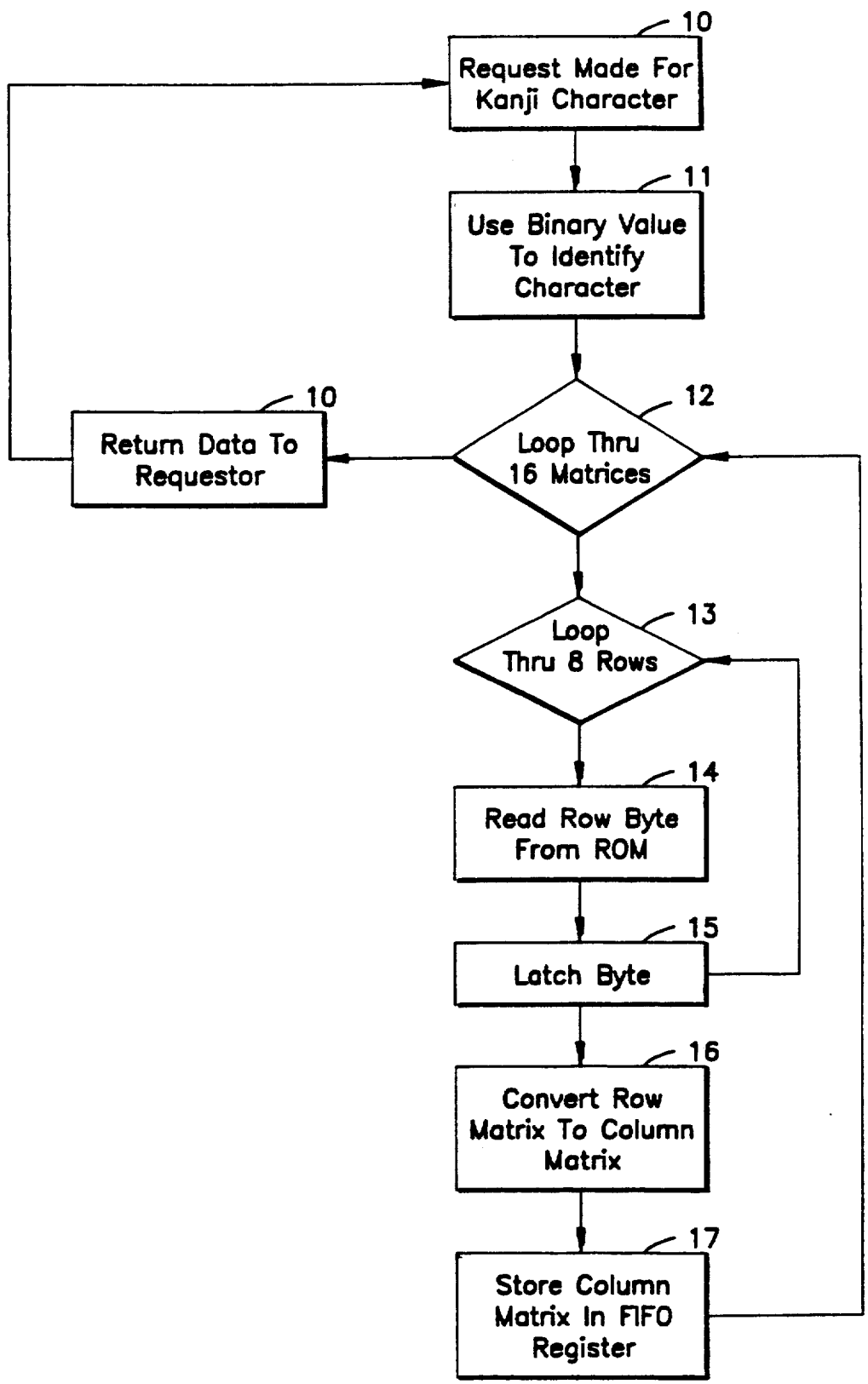
FIG. 1 is a flow diagram describing the method of the present invention.
Figure 2:
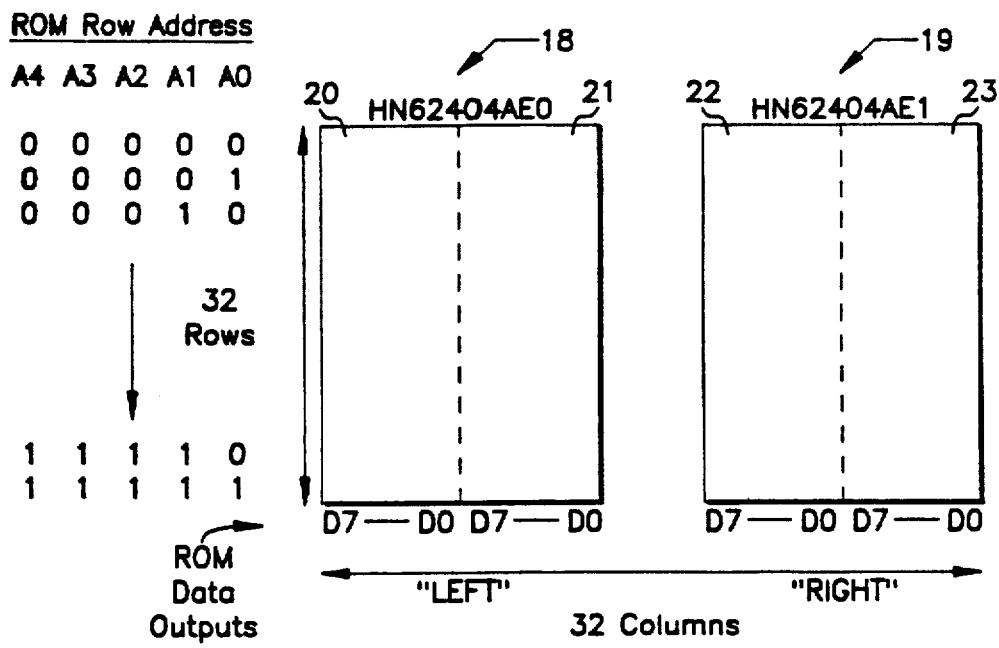
FIG. 2 is a detailed drawing of the physical implementation of a row-oriented Kanji character stored in ROM.

FIG. 1 is a flow chart describing the operation of a peripheral device built to perform this conversion. In the preferred embodiment, software running on a host computer makes a request to access the peripheral. The host computer passes the 18 bit Kanji character address to the peripheral. The peripheral receives the request (10) and uses the most significant 13 bits of the address to identify the character location (11). The peripheral executes a loop to access the 16 separate 8 bit × 8 bit matrices in order (12). The peripheral executes a loop to access the 8 separate 8 bit rows in order (13). Each row is read from the ROM (14) and stored in an 8 bit latch (15). Once the entire 8 bit × 8 bit matrix has been read, the matrix is converted into column-oriented data (16). As each column of the matrix is converted, it is stored in the FIFO register (17). When the conversion of the entire Kanji character is completed, 128 bytes reside in the FIFO register. The peripheral indicates the completion of the operation by storing a specfic value in a status byte register. The host computer, which monitors the status byte register, recognizes the completion and issues a read request to the peripheral for each of the 128 bytes (9). When all of the data is transferred to the host computer, the peripheral signals, via the status byte register, that it is available for another conversion operation.

The preferred embodiment can convert a Kanji character in 128 microseconds. The speed is limited by the access time of the ROM (i.e., 200 nanoseconds). Thus, in the preferred embodiment hardware conversion provides a performance multiple of 15.63 over software conversion.

$$\frac{(Software)}{(Hardware)} \frac{0.002 \text{ seconds}}{0.000128 \text{ seconds}} = 15.63$$

Although a specific configuration has been illustrated and described for the preferred embodiment of the present invention set forth herein, it will be appreciated by those of ordinary skill in the art that any arrangement which is calculated to achieve the same purpose may be substituted for the preferred embodiment shown. This application is intended to cover any adaptations or variations of the present invention. Therefore it is manifestly intended that this invention be limited only by the claims and the equivalents thereof.

What is claimed is:

1. Apparatus peripheral to a computer for converting data from a row-orientation to column-orientation, comprising:
   (a) a memory device storing a plurality of bit-mapped characters;
   (b) input signalling means for receiving a first address having a first number of bits from the computer identifying one of said bit-mapped characters stored in said memory device;
   (c) first looping means for selecting and accessing in order, at a second address from said computer, said second address being a second number of most significant bits from said first address, wherein said first number of bits is greater than said second number of bits, each bit matrix of a plurality of bit matrices comprising said bit-mapped character;
   (d) second looping means for selecting and accessing in order each row of a plurality of rows comprising said bit matrices;
   (e) latching means for storing said selected row of a selected bit matrix into one of a plurality of latches;
   (f) conversion means for converting said selected matrix stored in said latches from a row-orientation into a column-orientation suitable for use by the computer, wherein a plurality of bits are selected and read from said latches according to their position in said latches;
   (g) buffering means for storing said selected and read bits into one of a plurality of memory locations in a FIFO register;
   (h) output generating an output signal to signal means for signalling the computer when the conversion is complete and said bit matrices of said bit-mapped character are stored in said FIFO register ready for transfer to the computer; and
   (i) data transfer means, in response to a data transfer request signal from the host computer, for transferring said bit-mapped character from said FIFO register to the computer, and resetting said output signal when ready for the next conversion.

2. A method of converting data from a row-orientation to column-orientation with a device peripheral to a computer comprising:
   (a) receiving a first address having a first number of bits from the computer identifying one of a plurality of bit-mapped characters stored in a memory device;
   (b) selecting and accessing in order, utilizing said address at a second address from said computer, said second address having a second number of most significant bits from said first address, where said first number is greater than said second number, each bit matrix of a plurality of bit matrices comprising said bit-mapped character;
   (c) selecting and accessing in order, utilizing said address, each row of a plurality of rows comprising said selected bit matrix;
   (d) storing said selected row of said selected bit matrix into one of a plurality of latches;
   (e) converting said selected bit matrix stored in said latches from a row-orientation into a column-orientation suitable for use by the computer, wherein a plurality of bits are selected and read from said latches according to their position in said latches;
   (f) storing said selected and read bits into one of a plurality of memory locations in a FIFO register;
   (g) generating an output signal to signal the computer when the conversion is complete and said bit matrices of said bit-mapped character are stored in said FIFO register ready for transfer to the computer; and
   (h) transferring, in response to a data transfer request signal from the host computer, the character from said FIFO register to the computer, and resetting said output signal when ready for the next conversion.

* * * * *